Patented Feb. 21, 1928.

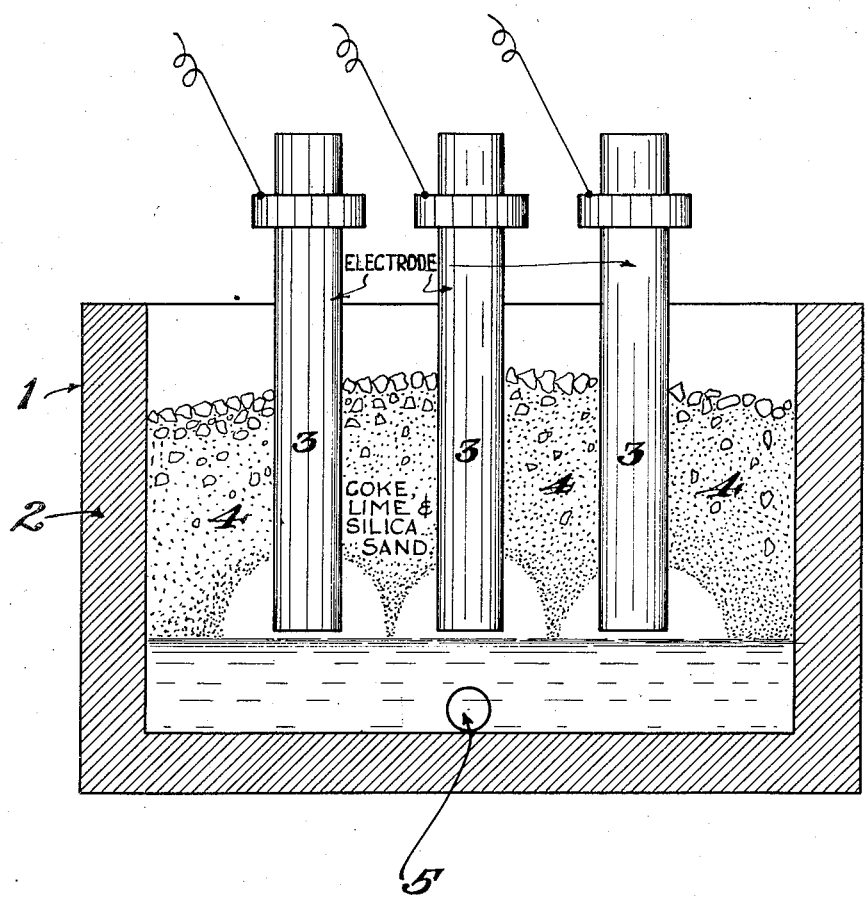

1,660,144

UNITED STATES PATENT OFFICE.

HAROLD E. WHITE, OF ANNISTON, ALABAMA, ASSIGNOR TO FEDERAL ABRASIVES COMPANY, OF BIRMINGHAM, ALABAMA, A CORPORATION OF ALABAMA.

PROCESS FOR THE PRODUCTION OF SILICON CARBIDE AND CALCIUM CARBIDE.

Application filed November 23, 1925. Serial No. 70,768.

My invention relates to the commercial production of silicon carbide and calcium carbide in one furnace operation by an improved method and in a type of furnace, not heretofore available for use in silicon carbide production.

One object of my invention is the production of silicon carbide especially suited to certain uses in the arts. Another object is the production of calcium carbide simultaneously, or during the same furnace operations. A further object is the utilization of materials for the production of silicon carbide which are considered unsuited for use in the present resistor type of silicon carbide furnace.

The present method of manufacturing silicon carbide consists in the utilization of a resistor-type furnace, in which the electric current is passed through a granular carbon conductor thereby generating heat which raises the temperature of the charge in such manner that the silica is reduced by the action of the carbon present in the furnace charge. The vapors of silicon react with the carbon and form silicon carbide. Such a furnace operation is intermittent, each cycle comprising the periods in which the furnace is being charged, the power is on and the reaction is taking place, the furnace is cooling down, the furnace walls are being removed, and the silicon carbide is being separated from the unreacted charge. Such a cycle is obviously undesirable from the standpoint of continuity of operation and the utilization of heat.

Very high grade silica sand, containing at least 99% $SiO_2$, and high grade coke containing a very low percentage of ash, and sawdust are necessary for the raw materials in such an operation. These high grade materials are essential because of the fact that it is necessary to use the unreacted charge in subsequent furnace operations in order to obtain commercial results. In case lower grade materials are used the impurities such as iron, alumina, lime, and like impurities present in sand and coke are largely distilled from the interior of the furnace, where the silicon carbide reaction is taking place, and condense in the outer charge which is subsequently recharged into the furnace with new material. From the foregoing it is clear that if the impurities condense there will be an accumulation of them and sooner or later the quality of silicon carbide produced will be lowered to such a point as to be of no commercial value, because the distillation is not complete and some of the impurities remain in, and consequently contaminate, the silicon carbide.

The production of calcium carbide as practised at present, is carried out by furnacing a mixture of lime and coke in an arc type furnace in which the heat is generated and the carbon of the coke reduces the lime and then reacts to form calcium carbide. The calcium carbide thus formed is periodically tapped from the furnace and disposed of according to the purpose for which the calcium carbide is desired. It is necessary in the production of calcium carbide in this manner to use high grade lime. Ordinarily commercial by-product coke may be used as a satisfactory source of carbon.

I have observed in the operation of furnaces producing calcium carbide by the reduction of lime with coke, and the production of metallic silicon from silica with coke, that under certain conditions silicon carbide is formed in overheated parts of the furnace. This observation led me to the conclusion that with proper preparation of materials and suitable furnace operation, silicon carbide and calcium carbide might be produced in the same operation from an arc type furnace, and that, by suitably preparing the raw materials and controlling the furnace operation, the quantity and quality of the silicon carbide and calcium carbide might be controlled.

Upon investigating the furnacing of suitable materials it was demonstrated that these conclusions were correct and I found it to be possible to simultaneously produce calcium carbide and silicon carbide and to obtain a product of the desired composition; and that I could control the operation in such a manner as to produce a material of the character desired.

According to my process calcium carbide and silicon carbide are tapped as a slag from the furnace or are removed as a cool mass from the furnace. The slag is allowed to cool and the cool slag or the cool mass removed from the furnace is then broken up and treated with water to decompose the calcium carbide into acetylene gas and slack lime or hydrated lime. The acetylene gas is recovered in any desirable manner and the silicon carbide in crystal form is separated from the slack lime by mechanical separation, acid treatment, or in any other practical manner.

I am aware of United States Patent No. 937,119, relating to a process for the production of silicon carbide from a mixture of silica and carbon in an arc type furnace, wherein the arc zone is moved away from the silicon carbide as formed to permit of its removal. In my process it is not necessary to move the arc zone, and furthermore I may tap my furnace if desired, because the silicon carbide is dissolved in the calcium carbide and does not crystallize until the melt cools.

In carrying out the combined operations, in which calcium carbide and silicon carbide are produced, I preferably employ a type of furnace as illustrated in the drawing, although any type of arc furnace will be suitable for my purpose. Referring to the drawing, the furnace 1 has a lining 2 of any suitable refractory material, and electrodes 3. It is charged with raw materials in the desired proportions to form the mix 4 which is heated by the electric current entering through the electrodes 3. When the charge is heated, the carbon in the mix reduces the oxides present and a mixture of calcium carbide and silicon carbide is produced. This mixture in the form of a calcium carbide and silicon carbide slag is tapped from the furnace through a tap hole 5. While in this drawing I have illustrated the operation in a tapping furnace, it is possible to employ a non-tapping furnace if it is desired to produce larger crystals of silicon carbide, in which case the furnace shell will be removed and the cooled mass broken up into suitable sized pieces. As illustrative of the character and proportions of materials suitable for the mix in my furnace operation the following is given:

50 lbs. silica sand, 96% $SiO_2$; 50 lbs. burnt lime, 93% $CaO$; 60 lbs. coke, 85% fixed carbon.

Instead of using a mixture of silica sand, lime and coke, it is possible to use a calcium silicate slag, such, for instance as is obtained from electric furnace smelting of phosphate rock. The composition of these slags vary widely from 36% $SiO_2$ and 53% $CaO$, to 50% $SiO_2$ and 39% $CaO$. The proportion of calcium carbide and silicon carbide produced will depend on the proportions of lime and silica in the charge used.

Since my operation is one in which the silicon carbide crystallizes from a calcium carbide slag, it is obvious that the crystallization will produce a very high purity silicon carbide. Further, it will be seen that impurities will be fluxed out of the charge, and since none of the residue is subsequently charged into the furnace, there is no accumulation of impurities to contaminate the product. While there is always a percentage of impurities in the sludge after the slag is decomposed to generate acetylene, these impurities may be eliminated by an acid wash, or otherwise which will serve to separate the silicon carbide from the impurities. This treatment readily eliminates the chief impurities. In some instances it is desirable to treat the sludge to eliminate objectionable impurities as silicon. Such elimination may be accomplished by means of caustic soda. The crystalline silicon carbide as separated from the sludge, is very finely divided, and is especially adapted for use in polishing and grinding where a fine silicon carbide is needed.

When the material is tapped from the furnace, the slag may contain varying proportions of calcium carbide and silicon carbide, depending upon the desired results at the time the charge is prepared. A slag taken for illustration will, when decomposed with water, yield 2 cubic feet of acetylene per pound.

When the above sludge is properly treated to remove the crystalline silicon carbide from the other impurities, it will on analysis be found to contain the following percentages:

$SiC$, 99.5%; $SiO_2$, 0.25%; $R_2O_3$, 0.25%; $MgO$, trace; $CaO$, trace.

What I claim as new and desire to secure by Letters Patent, is:—

1. The hereindescribed process for the production of calcium carbide and silicon carbide, which consists in smelting a mixture of lime, silica and carbonaceous material, substantially as described.

2. The hereindescribed process for the production of calcium carbide and silicon carbide, which consists in smelting a mixture of lime, silica and carbonaceous material in an electric furnace, substantially as described.

3. The hereindescribed process for the production of calcium carbide and silicon carbide, which consists in smelting a mixture of lime, silica, and carbonaceous material in an arc type electric furnace, substantially as described.

4. A new process for the production of silicon carbide, which consists in crystallizing silicon carbide in a calcium carbide slag, hydrating the calcium carbide, dissolving the resultant lime, and removing the silicon carbide crystals from the resultant solution.

5. The hereindescribed steps in a new process for the production of silicon carbide, which consists in charging a mixture of lime, silica and carbonaceous material into an arc type electric furnace, smelting said charge, producing a molten mass, removing said mass from the furnace, cooling to crystallize silicon carbide, decomposing said calcium carbide, treating residues from calcium carbide decomposition, and recovering crystalline silicon carbide, substantially as described.

6. The hereindescribed steps in a new process for the production of silicon carbide, which consists in charging a mixture of silica sand, lime and carbonaceous material into an arc type electric furnace, smelting said charge, producing a molten mass, removing said mass from the furnace, cooling said mass to crystallize silicon carbide, decomposing said calcium carbide, treating residues from calcium carbide decomposition, and recovering crystalline silicon carbide, substantially as described.

7. The hereindescribed process for the production of silicon carbide and acetylene gas, which consists in charging a mixture of silica sand, lime and carbonaceous material into a suitable furnace and smelting said mix to produce a molten mass composed principally of silicon carbide and calcium carbide, removing and cooling said mass, treating said mass to decompose the calcium carbide into acetylene gas and hydrated lime, collecting said gas, and removing the silicon carbide in crystalline form from the hydrated lime residue.

8. The hereindescribed process for the production of high purity crystalline silicon carbide, which consists in smelting a mix of silica sand, lime and carbonaceous material to produce a mass composed essentially of silicon carbide and calcium carbide, removing said mass from the furnace and allowing it to cool and the silicon carbide to crystallize, breaking up the cool mass, applying a suitable decomposing agent for the calcium carbide, and removing the crystalline silicon carbide from the residue of the decomposed calcium carbide.

In testimony whereof I affix my signature.

HAROLD E. WHITE.